(12) United States Patent
Pal et al.

(10) Patent No.: US 11,359,578 B2
(45) Date of Patent: Jun. 14, 2022

(54) RAMJET ENGINE WITH ROTATING DETONATION COMBUSTION SYSTEM AND METHOD FOR OPERATION

(71) Applicant: General Electric Company, Schenectady, NY (US)

(72) Inventors: Sibtosh Pal, Mason, OH (US); Steven Clayton Vise, Loveland, OH (US); Arthur Wesley Johnson, Cincinnati, OH (US); Clayton Stuart Cooper, Loveland, OH (US); Joseph Zelina, Waynesville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 338 days.

(21) Appl. No.: 16/055,313

(22) Filed: Aug. 6, 2018

(65) Prior Publication Data
US 2020/0040843 A1     Feb. 6, 2020

(51) Int. Cl.
| F02K 7/10 | (2006.01) |
| F02K 7/08 | (2006.01) |
| F02C 7/042 | (2006.01) |
| F02K 1/08 | (2006.01) |

(52) U.S. Cl.
CPC .................. F02K 7/10 (2013.01); F02K 7/08 (2013.01); *F02C 7/042* (2013.01); *F02K 1/085* (2013.01); *F05D 2220/10* (2013.01)

(58) Field of Classification Search
CPC ..... F23R 7/00; F02K 7/08; F02K 7/10; F02K 1/17; F02C 7/042; F05D 2220/10
USPC .......................................................... 60/265
See application file for complete search history.

(56) References Cited

U.S. PATENT DOCUMENTS

| 2,443,186 A | 6/1948 | Foulks |
| 2,515,644 A | 7/1950 | Goddard |
| 2,580,908 A | 1/1952 | Goddard |

(Continued)

FOREIGN PATENT DOCUMENTS

| CN | 101327844 A | 12/2008 |
| CN | 102877984 A | 1/2013 |
| CN | 105736178 A | 7/2016 |

OTHER PUBLICATIONS

Lu et al "Rotating Detonation Wave Propulsion: Experimental Challenges, Modeling, and Engine Concepts", Journal of Propulsion and Power, vol. 30, No. 5, Sep.-Oct. 2014, pp. 1125-1142 (Year: 2014).*

(Continued)

*Primary Examiner* — Ted Kim
(74) *Attorney, Agent, or Firm* — Venable LLP; Elizabeth C. G. Gitlin; Michele V. Frank (57) ABSTRACT

A ramjet engine and system and method for operation is generally provided. The ramjet includes a longitudinal wall extended along a lengthwise direction. The longitudinal wall defines an inlet section, a combustion section, and an exhaust section. A fuel nozzle assembly is extended from the longitudinal wall. The fuel nozzle assembly defines a nozzle throat area. The fuel nozzle assembly is moveable along a radial direction to adjust the nozzle throat area based at least on a difference in pressure of a flow of fluid at an inlet of the inlet section and a pressure of the flow of fluid at the fuel nozzle assembly.

12 Claims, 4 Drawing Sheets

(56) References Cited

U.S. PATENT DOCUMENTS

| | | | | |
|---|---|---|---|---|
| 2,737,019 | A | * | 3/1956 | Billman .................. F02C 7/042 60/794 |
| 2,930,196 | A | | 3/1960 | Hertzberg et al. |
| 2,966,028 | A | * | 12/1960 | Johnson .................. F02C 7/042 137/15.1 |
| 2,984,305 | A | | 5/1961 | Ranson |
| 3,040,516 | A | * | 6/1962 | Brees ....................... F02K 7/10 60/208 |
| 3,078,658 | A | * | 2/1963 | Sargent .................. F02C 7/057 60/243 |
| 3,181,817 | A | * | 5/1965 | Milton ..................... F02C 7/057 244/53 B |
| 3,240,010 | A | * | 3/1966 | Morrison ................. F23R 7/00 60/213 |
| 3,295,555 | A | * | 1/1967 | James ..................... F02C 7/042 244/53 B |
| 3,353,359 | A | * | 11/1967 | Webb ....................... F02K 9/64 60/265 |
| 3,659,422 | A | * | 5/1972 | Hope .................... F02K 1/1207 60/224 |
| 4,893,468 | A | | 1/1990 | Hines |
| 5,224,344 | A | | 7/1993 | Keirsey et al. |
| 5,806,301 | A | * | 9/1998 | auBuchon ................ F02K 7/10 137/15.2 |
| 6,293,091 | B1 | | 9/2001 | Seymour et al. |
| 6,584,765 | B1 | | 7/2003 | Tew et al. |
| 6,637,187 | B2 | | 10/2003 | Sanders et al. |
| 6,857,261 | B2 | | 2/2005 | Wilson et al. |
| 6,931,858 | B2 | | 8/2005 | Venkataramani et al. |
| 7,950,235 | B1 | | 5/2011 | Giddings |
| 8,429,893 | B2 | | 4/2013 | Rupp et al. |
| 8,484,980 | B1 | * | 7/2013 | Trefny ....................... F02K 7/10 60/767 |
| 9,103,280 | B2 | | 8/2015 | Rupp et al. |
| 9,109,539 | B2 | | 8/2015 | Duge et al. |
| 9,512,805 | B2 | | 12/2016 | Snyder |
| 9,556,794 | B2 | | 1/2017 | Falempin et al. |
| 9,732,670 | B2 | | 8/2017 | Joshi et al. |
| 9,752,453 | B2 | | 9/2017 | Rupp et al. |
| 2007/0256419 | A1 | * | 11/2007 | Baker ................... F02K 1/1292 60/771 |
| 2014/0196460 | A1 | | 7/2014 | Falempin et al. |
| 2017/0082068 | A1 | | 3/2017 | Lee |

OTHER PUBLICATIONS

Bykovski et al "Continuous Spin Detonations" Journal of Propulsion and Power, vol. 22, No. 6, Nov.-Dec. 2006, pp. 1204-1216 (Year: 2006).*

Zhou et al "Progress of continuously rotating detonation engines" Chinese Journal of Aeronautics, vol. 29, Issue 1, Feb. 2016, pp. 15-29 (Year: 2015).*

Lin et al "Experimental study on propagation mode of H2/Air continuously rotating detonation wave", international journal of hydrogen energy 4 0( 2 0 1 5 ), pp. 1980-1993. (Year: 2015).*

* cited by examiner

RAMJET ENGINE WITH ROTATING DETONATION COMBUSTION SYSTEM AND METHOD FOR OPERATION

FIELD

The present subject matter is related to continuous detonation combustion systems for Brayton cycle machines.

BACKGROUND

Ramjets are a form of air-breathing engine in which the geometry of the ramjet and its forward motion together compress air entering its combustion section before igniting a fuel-air mixture to produce thrust. As such, the combustion process—such as an amount and pressure of air entering the combustion section for mixing with fuel—is dependent on the velocity of the ramjet itself, or the vehicle to which the ramjet is attached, and the velocity of air entering the ramjet as a result of forward movement of the ramjet.

Therefore, a range of ramjet combustion efficiency or operability is substantially dependent or limited by the speed of the ramjet itself, and consequently, the velocity of the flow of air entering the ramjet. As such, there is a need for an improved ramjet engine that operates more independently of ramjet engine velocity or the velocity of air entering the ramjet.

BRIEF DESCRIPTION

Aspects and advantages of the invention will be set forth in part in the following description, or may be obvious from the description, or may be learned through practice of the invention.

An aspect of the present disclosure is directed to a ramjet engine. The engine includes a longitudinal wall extended along a lengthwise direction. The longitudinal wall defines an inlet section, a combustion section, and an exhaust section. A fuel nozzle assembly is extended from the longitudinal wall. The fuel nozzle assembly defines a nozzle throat area. The fuel nozzle assembly is moveable along a radial direction to adjust the nozzle throat area based at least on a difference in pressure of a flow of fluid at an inlet of the inlet section and a pressure of the flow of fluid at the fuel nozzle assembly.

In one embodiment, the engine further includes an actuator assembly coupled to the fuel nozzle assembly. The actuator assembly is configured to extend and retract the fuel nozzle assembly to adjust the nozzle throat area.

In another embodiment, the engine further includes a centerbody defined radially inward of the longitudinal wall. The fuel nozzle assembly is extended from the centerbody into a gas flowpath defined by the longitudinal wall.

In still another embodiment, the fuel nozzle assembly includes a convergent-divergent nozzle.

Another aspect of the present disclosure is directed to a system for operating a ramjet engine. The system includes a fuel nozzle assembly extended from one or more of a longitudinal wall or a centerbody. The fuel nozzle assembly defines a nozzle throat area. The fuel nozzle assembly is moveable along a radial direction to adjust the nozzle throat area based at least on a difference in pressure of a flow of fluid upstream and downstream of the fuel nozzle assembly.

In one embodiment, the system further includes an actuator assembly coupled to the fuel nozzle assembly. The actuator assembly may further be coupled to one or more of the longitudinal wall or the centerbody. The actuator assembly is configured to extend and retract the fuel nozzle assembly to adjust the nozzle throat area.

In another embodiment, the fuel nozzle assembly comprises a convergent-divergent nozzle.

In various embodiments, the system further includes a controller configured to perform operations. The operations include modulating the nozzle throat area to change a geometry of shockwaves from the inlet section downstream to the fuel nozzle assembly.

In one embodiment, modulating the nozzle throat area to change a geometry of shockwaves includes changing an angled train of oblique shockwaves to a substantially normal shockwave at the fuel nozzle assembly.

In various embodiments, the operations further include extending or retracting the fuel nozzle assembly into a gas flowpath to modulate the nozzle throat area. In one embodiment, extending or retracting the fuel nozzle assembly is based at least on a Mach number of inlet air flow. In another embodiment, extending or retracting the fuel nozzle assembly to modulate the nozzle throat area is based at least on maintaining a substantially constant dynamic pressure at the inlet section. In still another embodiment, extending or retracting the fuel nozzle assembly is based on a minimum number of cells required to sustain a desired rotating detonation downstream of the fuel nozzle assembly.

In one embodiment, the operations further include increasing the nozzle throat area to increase output thrust; and decreasing the nozzle throat area to decrease output thrust.

In another embodiment, the operations further include adjusting a stoichiometry of fuel and oxidizer via changes in flow rate of fuel at the fuel nozzle assembly.

Another aspect of the present disclosure is directed to a method for operating a ramjet engine. The method includes modulating a nozzle throat area at a rotating detonation combustion section to change a geometry of shockwaves from an inlet section of the engine to a fuel nozzle assembly defining the nozzle throat area.

In one embodiment, the method further includes extending or retracting the fuel nozzle assembly at a gas flowpath to modulate the nozzle throat area.

In another embodiment, modulating the nozzle throat area is based at least on a Mach number of inlet air flow.

In still another embodiment, the method further includes adjusting a stoichiometry of fuel and oxidizer via changes in flow rate of fuel at the fuel nozzle assembly.

In still yet another embodiment, modulating the nozzle throat area is based at least on maintaining a substantially constant dynamic pressure at the inlet section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a heat engine or vehicle, and refer to the normal operational attitude of the heat engine or vehicle. For example, with regard to a heat engine, forward refers to a position closer to a heat engine inlet and aft refers to a position closer to a heat engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Embodiments of an improved ramjet engine and method for operation are generally provided that enable substantially independent operation of the combustion section versus ramjet engine velocity or ramjet inlet airflow velocity.

Figure 1:
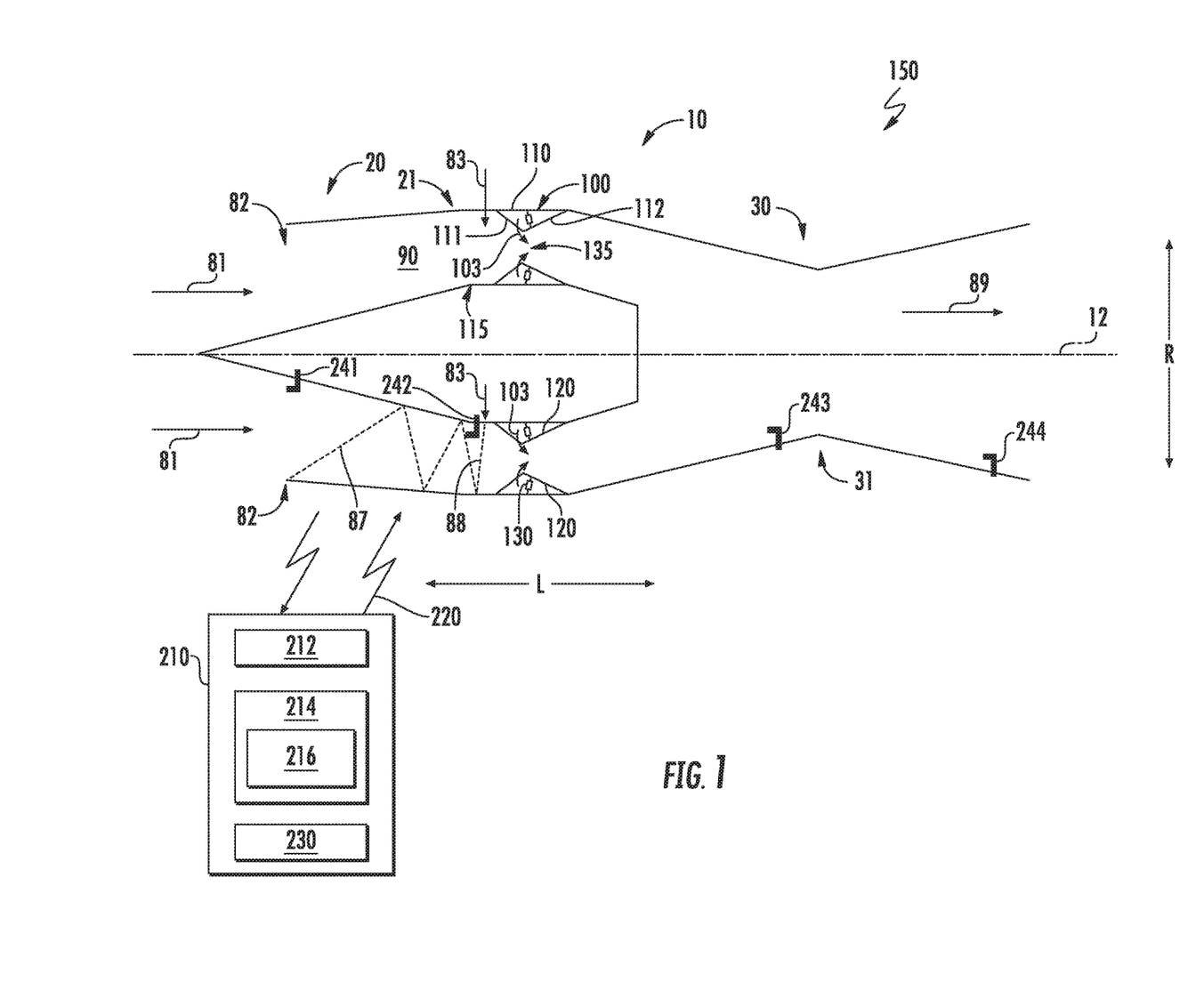
FIG. 1 is a schematic, cross-sectional view of an exemplary embodiment of a system for operating a ramjet engine according to an aspect of the present disclosure.

Referring now to the drawings, FIG. 1 is a lengthwise cross sectional view of an exemplary ramjet engine 10 (hereinafter, "engine 10"). The engine 10 includes an inlet section 20, a combustion section 100, and an exhaust section 30 in serial flow arrangement along a lengthwise direction L. The engine 10 includes a longitudinal wall 110 extended along the lengthwise direction L. The longitudinal wall 110 defines, at least in part, a gas flowpath 90 of the engine 10. The longitudinal wall 110 is extended along the lengthwise direction L and contoured to define the combustion section 100 of the engine 10. The longitudinal wall 110 may further be extended along the lengthwise direction L and contoured to define the inlet section 20 and/or the exhaust section 30.

The inlet section 20 is generally contoured to admit a flow of oxidizer, shown schematically by arrows 81, into the engine 10 to flow through the gas flowpath 90 to the combustion section 100. The engine 10 generally is configured to admit a flow of oxidizer 81 into the engine 10, including a supersonic flow, such as greater than approximately Mach 2. The longitudinal wall 110 defines contours such as to retard the flow of oxidizer 81 upstream of the combustion section 100 to a subsonic axial velocity (i.e., less than Mach 1), such as generally depicted at contour 21.

Referring still to FIG. 1, the longitudinal wall 110 of the engine 10 generally depicted further defines contours such as to define an exhaust nozzle 31 at the exhaust section 30. The exhaust nozzle 31 accelerates a flow of combustion gases through the gas flowpath 90, shown schematically by arrows 89, from the combustion section 100 to generate thrust. The exhaust nozzle 31 may define a convergent nozzle or a convergent-divergent nozzle based at least on a desired range of operating air speed of the engine 10.

In one embodiment, the engine 10 includes a centerbody 115 disposed around a longitudinal axis 12 and radially inward of the longitudinal wall 110. The centerbody 115 is extended along the lengthwise direction L. In various embodiments, the longitudinal wall 110 is extended substantially annularly around the longitudinal axis 12. As such, the engine 10 generally depicted in FIG. 1 may define a substantially axisymmetric configuration. However, it should be appreciated that in other embodiments the engine 10 may define a two-dimensional configuration, such as to define a width and height. Still further, in various embodiments, it should be appreciated that the engine 10 may define contoured, non-axisymmetric surfaces at the inlet section 20 and/or the exhaust section 30, such as configured to tune a shockwave entering the engine 10 or the thrust output exiting the engine 10.

The combustion section 100 generally defines a rotating detonation combustion (RDC) system including a moveable fuel nozzle assembly 120 extended from the longitudinal wall 110. The combustion section 100 defining the RDC system derives energy from a continuous detonation wave produced from a flow of liquid or gaseous fuel, shown schematically by arrows 103, and oxidizer, such as air 81 detonated, as opposed to burned, such as in a deflagrative type combustor. In deflagration, the flame propagation is a function of the heat transfer from a reactive zone to the fresh mixture, generally through conduction and convection. By contrast, with a detonation combustor, the detonation is a shock induced flame, which results in the coupling of a reaction zone and a shockwave. The shockwave compresses and heats the fresh fuel/oxidizer mixture, increasing such fuel/oxidizer mixture above a self-ignition point. On the other side, energy released by the combustion contributes to the propagation of the detonation shockwave. Further, with continuous detonation, the detonation wave propagates around the gas flowpath 90 downstream of the fuel nozzle assembly 120 in a continuous manner, operating at a relatively high frequency. Additionally, the detonation wave may be such that an average pressure downstream of the fuel nozzle assembly 120 is higher than an average pressure within typical combustion systems (i.e., deflagration combustion systems). Accordingly, the region behind the detonation wave has very high pressures.

The fuel nozzle assembly 120 generally defines a convergent-divergent nozzle at the combustion section 100. The fuel nozzle assembly 120 defining the convergent-divergent nozzle includes a first wall 111 extended inward into the gas flowpath 90 away from the wall to which the first wall 111 is attached (i.e., the longitudinal wall 110 or the centerbody 115). The fuel nozzle assembly 120 further includes a second wall 112 coupled to the first wall 111, in which the second wall 112 is extended outward from the gas flowpath 90 toward the wall to which the second wall 112 is attached (i.e., the longitudinal wall 110 or the centerbody 115).

In various embodiments, the fuel nozzle assembly 120 may include an actuator assembly 130 coupled to the longitudinal wall 110 or the centerbody 115. The actuator assembly 130 enables extension and retraction of the fuel nozzle assembly 120 along a radial direction R such as to decrease or increase, respectively, a nozzle throat area 135 at the fuel nozzle assembly 120.

During operation of the engine 10, the fuel nozzle assembly 120 is extended and retracted along the radial direction R to modulate the nozzle throat area 135 based on the velocity of the flow of air 81 entering the inlet section 20. During operation of the engine 10, the flow of air 81 entering the inlet section 20 (such as depicted at plane 82 in FIG. 1) defines a velocity along the lengthwise direction L approximately equal to Mach 2 or greater. In various embodiments, the flow of air 81 may generally define an inlet air flow velocity at plane 82 between Mach 2 and Mach 5. As the Mach number of the flow of air 81 at plane 82 increases with the speed of the engine 10, such as due to the output thrust 89, oblique shock structures change within the gas flowpath 90, such as between inlet plane 82 and plane 83 immediately upstream of the fuel nozzle throat 135.

The fuel nozzle assembly 120 actuates or otherwise modulates the nozzle throat area 135 to adjust or modulate a geometry of a train of oblique shockwaves from the inlet section 20, such as from plane 82 and downstream to the fuel nozzle assembly 120, and such as depicted schematically at lines 87, 88. For example, the fuel nozzle assembly 120 changes the nozzle throat area 135 based on changes in the velocity of the air 81 entering the inlet section 20. Changes in the nozzle throat area 135 induce changes in geometry of the train of oblique shockwaves, such as from an angled train of oblique shockwaves depicted at line 87 from the inlet plane 82, to a substantially normal shockwave depicted at line 88 at the inlet plane 83 of the fuel nozzle assembly 120. As such, the fuel nozzle assembly 120 modulates the nozzle throat area 135 such as to define a normal shockwave at plane 83. Still further, the fuel nozzle assembly 120 modulates the nozzle throat area 135 such as to reduce the velocity of the flow of air 81 from a relatively large Mach number (e.g., Mach 2 to Mach 5) at plane 82 to a relatively small Mach number just greater than Mach 1.

Modulation of the fuel nozzle assembly 120 changes or adjusts the nozzle throat area 135 based on the Mach number of the inlet air flow 81 such as to maintain a substantially constant dynamic pressure or velocity pressure at the inlet section 20, such as between plane 82 and plane 83. Furthermore, modulation of the fuel nozzle assembly 120 to adjust the nozzle throat area 135 adjusts the velocity of the flow of air 81 through the inlet section 20 between plane 82 and plane 83 such as to de-couple the velocity of the air 81 and the structure of the shockwave (e.g., depicted at line 88) at plane 83 from the velocity from the forward movement of the engine 10, such as the velocity of air 81 at plane 82 at the inlet section 20 of the engine 10.

The fuel nozzle assembly 120 further modulates the throat area 135 to increase output thrust 89 via increasing the nozzle throat area 135. Alternatively, the fuel nozzle assembly 120 further modulates the throat area 135 to decrease output thrust 89 via decreasing the nozzle throat area 135.

For example, the fuel nozzle assembly 120 is extended into or retracted from the gas flowpath 90 based on a minimum number of cells required to sustain a desired rotating detonation downstream of the fuel nozzle assembly 120. The detonation cell is characterized by a cell width ($\lambda$) that depends on the type of fuel (e.g., liquid or gaseous hydrogen or hydrocarbon fuel, or combinations thereof) and oxidizer (e.g., air or oxygen) as well as the pressure and temperature of the reactants (i.e., fuel 103 and oxidizer 81) and the stoichiometry ($\phi$) of the reactants. For each combination of fuel 103 and oxidizer 81, cell size decreases with increasing pressure and temperature, and for stoichiometry greater than or less than 1.0. As the cell width may decrease by 20 times or more from a lowest steady state operating condition to a highest steady state operating condition, the flow rate of fuel 103 is modulated based at least on a pressure, flow, or temperature of the oxidizer 81 egressing the fuel nozzle assembly 120 such as to provide a sustainable detonation cell size across a plurality of operating conditions (e.g., plurality of velocities of air 81 at plane 82) of the engine 10.

In various embodiments, the engine 10 further adjusts the stoichiometry of the fuel 103 and oxidizer 81 reactants via changes in flow rate of the fuel 103 and/or modulation of the fuel nozzle assembly 120 along the radial direction R such as to change the nozzle throat area 135. The engine 10 may generally adjust the stoichiometry of the reactants such as to adjust the pressure downstream of the fuel nozzle assembly 120. Adjusting the pressure downstream of the fuel nozzle assembly 120 thereby adjusts the pressure upstream of the fuel nozzle assembly 120. As such, adjusting or modulating the flow of fuel 103 through the fuel nozzle assembly 120 and/or adjusting the nozzle throat area 135 may generally be utilized to maintain a substantially constant dynamic pressure or velocity pressure of the air 81 between plane 82 and plane 83.

Referring back to FIG. 1, the engine 10 and a controller 210 may together be included as a system 150 for operating the engine 10, or an apparatus or vehicle including the engine 10. The controller 210 can generally correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions. In various embodiments, the controller 210 may be configured to operate the system 150 such as to modulate the fuel nozzle assembly 120 via the actuator assembly 130 to increase or decrease the nozzle throat area 135 based on the air 81 upstream of the fuel nozzle assembly 120.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC). In still various embodiments, the controller 210 may define a distributed network of controllers 210, or a distributed network of shared, dedicated, or grouped processors 212 or a network of memory 214 storage networked in clusters physically at the engine 10 or physically detached or remote therefrom.

As shown, the controller 210 may include control logic 216 stored in memory 214. The control logic 216 may include instructions that when executed by the one or more processors 212 cause the one or more processors 212 to perform operations such as extending or retracting the actuator assembly 130 such as described herein.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive and send data 220 from the engine 10.

For example, the engine 10 may include one or more sensors, such as a first sensor 241 disposed at plane 82, a second sensor 242 disposed at plane 83, a third sensor 243 disposed upstream of the nozzle 31 at the exhaust section 30, or a fourth sensor 244 disposed downstream of the nozzle 31 at the exhaust section 30. Each sensor 241, 242, 243, 244 may be configured to send data 220 to the controller 210. In various embodiments, the sensors are configured to measure or calculate pressure, flow rate, or temperature, or combinations thereof, of the fluid (e.g., flows 81, 89) through or around the engine 10. The data 220 from the sensors may be utilized by the controller 210 to determine the nozzle throat area 135 based at least on the pressure at plane 82 and plane 83 upstream of the fuel nozzle assembly 120. In various embodiments, the controller 210 determines the nozzle throat area 135 based further on the pressure downstream of the fuel nozzle assembly 120, such as at the third sensor 243 or the fourth sensor 244.

The data 220 from the sensors may further be utilized by the controller 210 to determine an amount by which the actuator assembly 130 extends or retracts the fuel nozzle assembly 120 such as to provide the determined nozzle throat area 135. In various embodiments, the controller 210 may utilize a transfer function, a lookup table, or a chart or schedule to further determine the amount by which the actuator assembly 130 extends or retracts to provide the determined nozzle throat area 135. In another embodiment, the controller may utilize a transfer function, a lookup table, or a chart of schedule to further determine or adjust the nozzle throat area 135 based on changes in the pressure, flow rate, and/or temperature of the fluid through or around the engine 10.

In addition, the communications interface module 230 can also be used to communicate with any other suitable components of the system 150 or the engine 10, such as to receive data or send commands to/from any number of valves, actuators, fuel systems, ports, etc. controlling speed, pressure, or flow at the engine 10. It should be appreciated that the communications interface module 230 can be any combination of suitable wired and/or wireless communications interfaces and, thus, can be communicatively coupled to one or more components of the system 150 via a wired and/or wireless connection. As such, the controller 210 may operate, modulate, or adjust operation of the engine 10, acquire data from one or more sensors or actuator assemblies 130, or transmit data thereto such as to control the engine 10 such as described herein.

Figure 2:
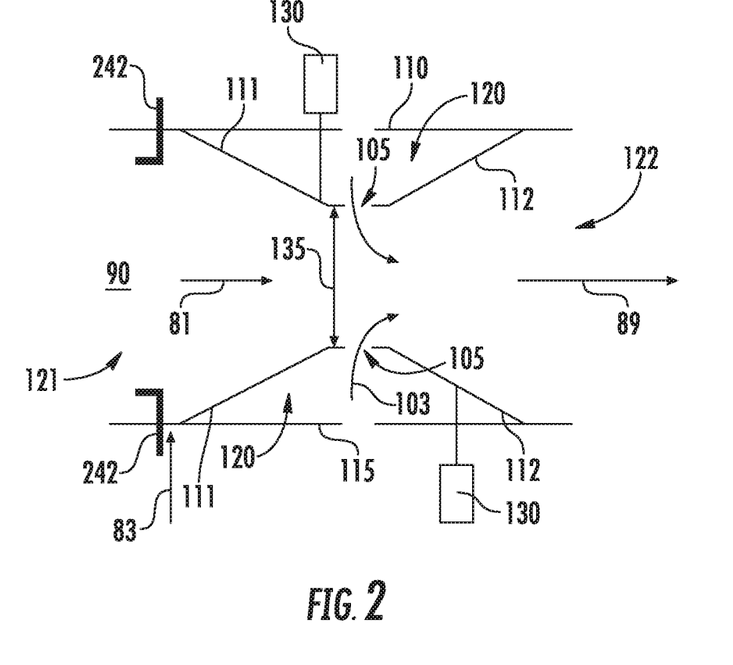
FIGS. 2-4 are schematic views of exemplary embodiments of a fuel nozzle assembly of the system of FIG. 1.
Figure 3:
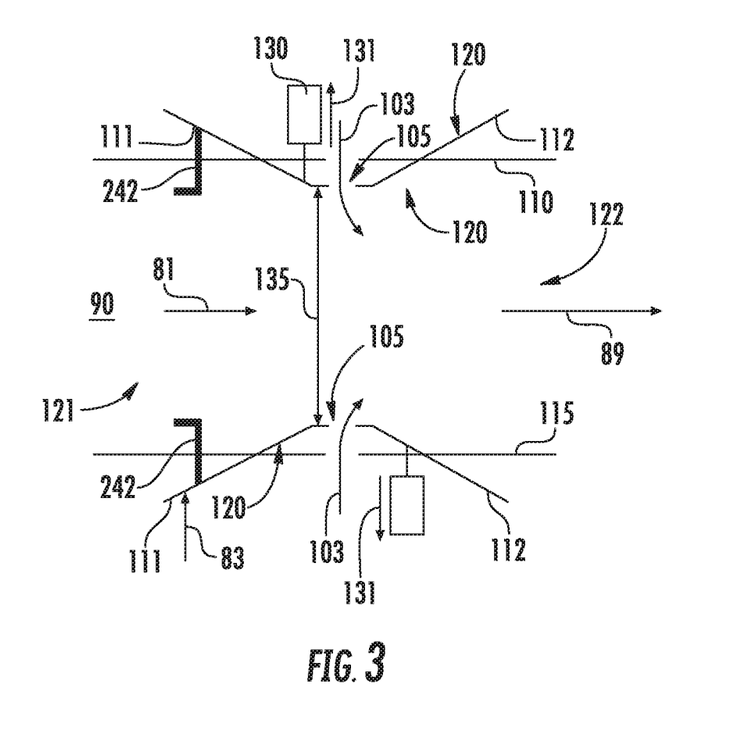
Figure 4:
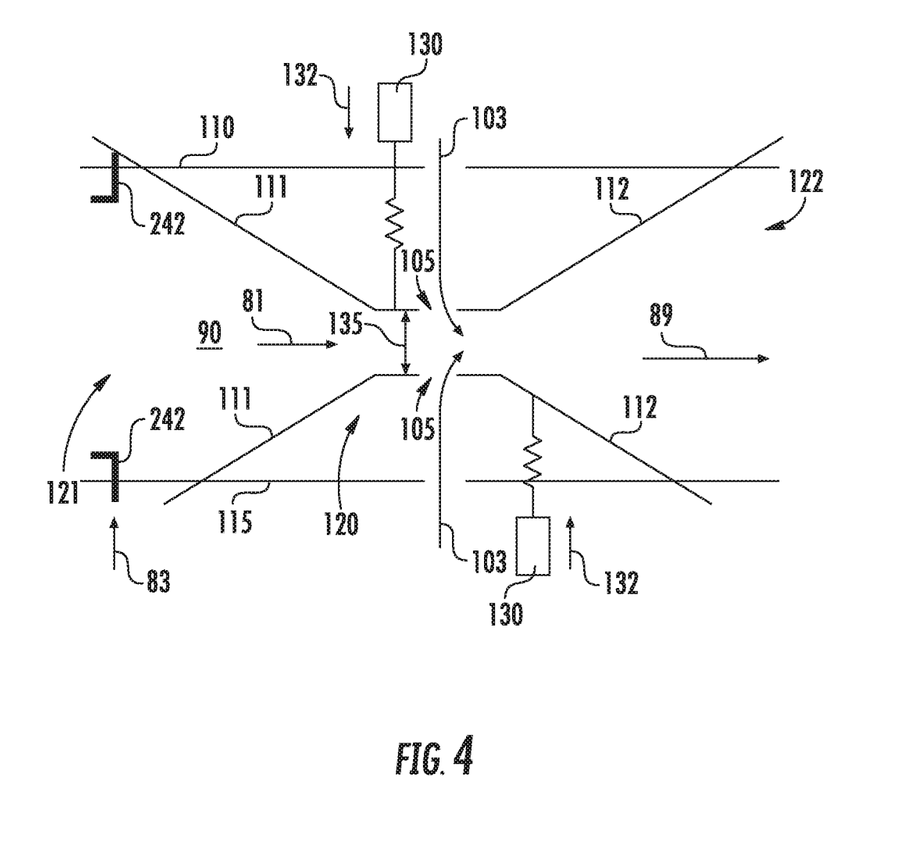

Referring now to FIGS. 2-4, in conjunction with FIG. 1, exemplary embodiments of the fuel nozzle assembly 120 at the gas flowpath 90 of the engine 10 in FIG. 1 are generally provided. The first wall 111 and the second wall 112 of the fuel nozzle assembly 120 may generally define a substantially annular nozzle wall generally concentric to the longitudinal axis 12 (FIG. 1) of the engine 10 defining an axisymmetric configuration. However, it should be appreciated that the first wall 111 and the second wall 112 of the fuel nozzle assembly 120 may define a substantially two-dimensional configuration corresponding to the engine 10 defining a two-dimensional configuration. The first wall 111 and the second wall 112 may together define a substantially continuous nozzle wall extended from a nozzle inlet 121 and a nozzle outlet 122 separated along the lengthwise direction L.

In various embodiments, the fuel nozzle assembly 120 is extended along the lengthwise direction L. In one embodiment, the fuel nozzle assembly 120 may be extended substantially parallel to the longitudinal axis 12 of the engine 10. However, in other embodiments, the fuel nozzle assembly 120 may be configured such as to define an angle relative to the longitudinal centerline 12 (FIG. 1). For example, the fuel nozzle assembly 120 may be defined at an angle between two degrees and forty-five degrees, or between five degrees and thirty-five degrees, or between ten degrees and thirty degrees, in the positive or negative relative to the longitudinal centerline axis 12 (e.g., converging or diverging).

In various embodiments, the fuel nozzle assembly 120 defines a converging-diverging nozzle assembly. For example, the first wall 111 converges inward or decreases in area into the gas flowpath 90 from the nozzle inlet 121 to approximately the nozzle throat area 135. As another example, the second wall 112 diverges or increases in area from the gas flowpath 90 from the nozzle throat area 135 to the nozzle outlet 122.

As depicted in FIGS. 2-4, the fuel nozzle assembly 120 further defines a fuel injection port 105 in fluid communication with the gas flowpath 90. The fuel injection port 105 is defined between the nozzle inlet 121 and the nozzle outlet 122 to provide a flow of liquid and/or gaseous fuel 103 to the gas flowpath 90 therebetween. In various embodiments, the fuel injection port 105 is positioned at the nozzle throat area 135, or downstream thereof along the lengthwise direction L. It will be appreciated, that as used herein, the term "at the throat of the nozzle" refers to including at least a portion of the component or feature positioned at a location within the gas flowpath 90 between the nozzle inlet 121 and the nozzle outlet 122 defining the smallest cross-sectional area (i.e., defining the nozzle throat area 135). Notably, for the embodiments of FIGS. 2-4, the nozzle throat area 135 of the exemplary fuel nozzle assembly 120 depicted is not a single point along the lengthwise direction L, and instead extends for a distance along the lengthwise direction L. For the purposes of measuring locations of features or parts relative to the throat 135, the measurement may be taken from anywhere within the gas flowpath 90 between the nozzle inlet 121 and the nozzle outlet 122 defining the throat 135.

Notably, although the fuel injection port 105 is depicted as including two outlets in radially adjacent arrangement, it should be understood that a plurality of fuel injection ports 105 may be distributed along the circumferential direction along the annulus of the fuel nozzle assembly 120.

The fuel 103 provided through the fuel injection port 105 may be any suitable fuel, such as a hydrocarbon-based liquid or gaseous fuel (or combinations thereof), for mixing with the flow of oxidizer 81. More specifically, for the embodiments depicted the fuel injection port 105 may be a liquid fuel injection port configured to provide a liquid fuel to the gas flowpath 90 between the nozzle inlet 121 and the nozzle outlet 122, such as a liquid jet fuel. However, in other exemplary embodiments, the fuel may be a gaseous fuel or any other suitable fuel.

Accordingly, for the embodiment depicted, positioning the outlet of the fuel injection port 105 in accordance with the description above may allow for the liquid fuel provided through the outlet of the fuel injection port 105 at the gas flowpath 90 to substantially completely atomize within the flow of oxidizer 81 provided through the nozzle inlet 121 of the fuel nozzle assembly 120. Such may provide for a more complete mixing of the fuel 103 within the flow of oxidizer 81, providing for a more complete and stable combustion downstream of the fuel injection port 105 in the gas flowpath 90.

It should further be appreciated that, although not depicted, each of the fuel injection ports 105 may be fluidly connected to a fuel source, such as a fuel tank, through one or more fuel lines for supplying the fuel 103 to the fuel injection ports 105.

Referring still to FIGS. 2-4, embodiments of the fuel nozzle assembly 120 varyingly extended into the gas flowpath 90 are generally provided. For example, FIG. 3 generally depicts a maximum nozzle throat area 135 defined when the actuator assembly 130 is fully retracted (e.g., along direction 131) such as to retract the fuel nozzle assembly 120, such as at the first wall 111 and the second wall 112, from the gas flowpath 90. As another example, FIG. 4 generally depicts a minimum nozzle throat area 135 defined when the actuator assembly 130 is fully extended (e.g., along direction 132) such as to extend the fuel nozzle assembly 120, such as at the first wall 111 and the second wall 112, into the gas flowpath 90. As still another example, FIG. 2 generally depicts an intermediate nozzle throat area 135 between the minimum and maximum fuel nozzle throat areas 135 such as depicted in regard to FIGS. 3-4.

The embodiment generally provided in regard to FIGS. 2-4 may generally correspond to operation of the system 150 such as described in regard to FIG. 1. For example, the actuator assembly 130 may retract along direction 131 to increase the nozzle throat area 135 such as to increase output thrust from the engine 10. As another example, the actuator assembly 130 may extend along direction 132 to decrease the nozzle throat area 135 such as to decrease output thrust from the engine 10. However, it should be appreciated that increases or decreases in output thrust may further correspond to increases or decreases in the flow of fuel 103 into the gas flowpath 90. It should further be appreciated, such as described herein, that changes in nozzle throat area 135 depicted in regard to FIGS. 2-4 generally illustrate the system 150 providing a substantially constant dynamic pressure or velocity pressure substantially de-coupled from changes in the velocity of air 81 entering the inlet section 20 or the nozzle inlet 121.

Figure 5:
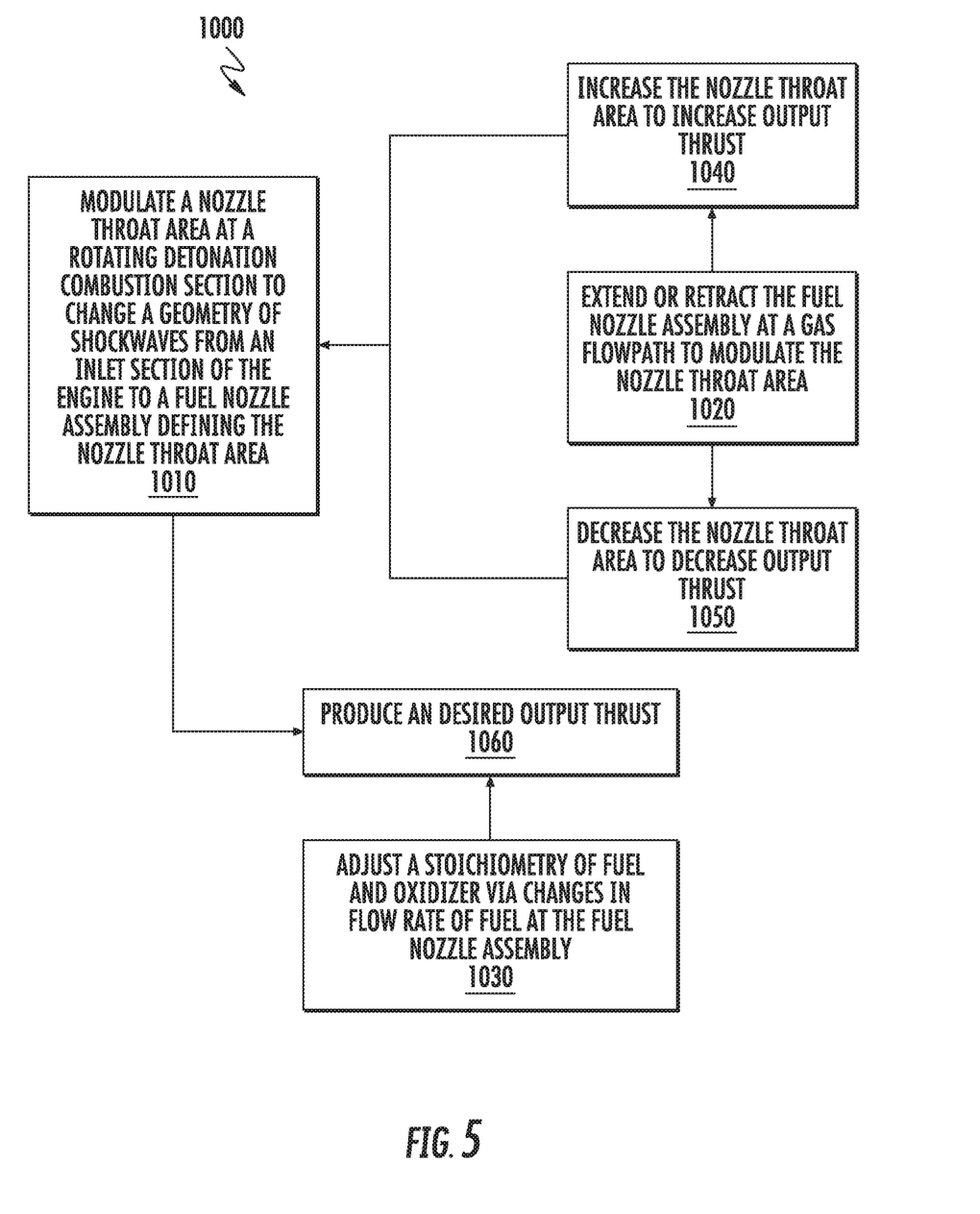
FIG. 5 is a flowchart outlining exemplary steps of a method for operating a ramjet engine.

Referring now to FIG. 5, a flowchart depicting exemplary steps of a method for operating a ramjet engine (hereinafter, "method 1000") is generally provided. The method 1000 may be implemented at the system 150 and engine 10 such as generally shown and described in regard to FIGS. 1-4. However, it should be appreciated that the method 1000 may be implemented and executed in other systems and engines not shown herein. Embodiments of the method 1000 for operating a ramjet engine generally provided herein may enable substantially independent operation of a combustion section of the engine relative to the velocity of air entering the inlet section of the engine.

The method 1000 includes at 1010 modulating a nozzle throat area at a rotating detonation combustion section to change a geometry of shockwaves from an inlet section of the engine to a fuel nozzle assembly defining the nozzle throat area, such as generally described and depicted in regard to FIGS. 1-4. In one embodiment, modulating the nozzle throat area is based at least on a Mach number of inlet air flow. In another embodiment, modulating the nozzle throat area is based at least on maintaining a substantially constant dynamic pressure at the inlet section.

In still another embodiment, the method 1000 further includes at 1020 extending or retracting the fuel nozzle assembly at a gas flowpath to modulate the nozzle throat area, such as generally depicted and described in regard to FIGS. 1-4. In one embodiment, extending or retracting the fuel nozzle assembly is based at least on a Mach number of inlet air flow. In another embodiment, extending or retracting the fuel nozzle assembly to modulate the nozzle throat area is based at least on maintaining a substantially constant dynamic pressure at the inlet section. In still another embodiment, extending or retracting the fuel nozzle assembly is based on a minimum number of cells required to sustain a desired rotating detonation downstream of the fuel nozzle assembly.

In still yet another embodiment, the method 1000 further includes at 1030 adjusting a stoichiometry of fuel and oxidizer via changes in flow rate of fuel at the fuel nozzle assembly, such as described and depicted in regard to FIGS. 1-4.

In yet another embodiment, the method 1000 further includes at 1040 increasing the nozzle throat area to increase output thrust, and at 1050 decreasing the nozzle throat area to decrease output thrust, such as depicted and described in regard to FIGS. 1-4.

In another embodiment, the method 1000 further includes at 1060 producing a desired output thrust based on at least one of the modulated nozzle throat area, the Mach number of the inlet air flow, maintaining a substantially constant dynamic pressure at the inlet section, or a minimum number of cells required to sustain a desired rotating detonation.

Embodiments of the system 150, the engine 10, and the method 1000 for operation generally provided herein enable substantially independent operation of the combustion section 100 relative to velocity of the air 81 entering the inlet section 20 of the engine 10. The system 150, the engine 10, and the method 1000 generally provided herein may generally provide operation of the engine 10 to produce a substantially constant dynamic pressure or velocity pressure substantially de-coupled from changes in the velocity of air 81 entering the inlet section 20. As such, the system 150 and the engine 10 generally provided herein may enable utilizing rotating detonation combustion systems in ramjet engine applications such as to improve ramjet engine operation, performance, or efficiency.

Furthermore, embodiments of the engine 10 generally provided herein may decrease a lengthwise dimension of the engine 10 via improved combustion performance and stability. As such, embodiments of the engine 10, such as ramjet may be improved or integrated into applications heretofore generally limited by known sizes or lengths of such engines or apparatuses to which the engine is installed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ramjet engine, the ramjet engine comprising:
a longitudinal wall extended along a lengthwise direction, wherein the longitudinal wall defines an inlet section, a combustion section, and an exhaust section;
a centerbody defined radially inward of the longitudinal wall;
a gas flowpath defined by the longitudinal wall; and
a convergent-divergent nozzle at the combustion section, the convergent-divergent nozzle including:
a first fuel nozzle assembly extended from the longitudinal wall into the gas flowpath; and
a second fuel nozzle assembly extended from the centerbody into the gas flowpath, wherein the first fuel nozzle assembly and the second fuel nozzle assembly together define a nozzle throat area of a rotating detonation combustion system,
wherein each of the first fuel nozzle assembly and the second fuel nozzle assembly comprising:
(a) a first wall converging inward toward the nozzle throat area;
(b) a second wall diverging outward from the nozzle throat area; and
(c) a fuel injection port positioned at the nozzle throat area in a wall connecting the first wall to the second wall,
wherein the first fuel nozzle assembly and the second fuel nozzle assembly are moveable along a radial direction to adjust the nozzle throat area based at least on a difference in pressure of a flow of fluid at an inlet of the inlet section and a pressure of the flow of fluid at the convergent-divergent nozzle.

2. The ramjet engine of claim 1, the ramjet engine further comprising:
a first actuator assembly coupled to the first fuel nozzle assembly and a second actuator assembly coupled to the second fuel nozzle assembly, wherein the first actuator assembly is configured to extend and retract the first fuel nozzle assembly and the second actuator assembly is configured to extend and retract the second fuel nozzle assembly to adjust the nozzle throat area.

3. A system for operating a ramjet engine, the system comprising:
a convergent-divergent nozzle including a first fuel nozzle assembly extended from a longitudinal wall into a gas flowpath of the ramjet engine and a second fuel nozzle assembly extended from a centerbody into the gas flowpath, wherein the first fuel nozzle assembly and the second fuel nozzle assembly together define a nozzle throat area of a rotating detonation combustion system in a combustion section of the ramjet engine, each of the first fuel nozzle assembly and the second fuel nozzle assembly comprising:
(a) a first wall converging inward toward the nozzle throat area;
(b) a second wall diverging outward from the nozzle throat area; and
(c) a fuel injection port positioned at the nozzle throat area in a wall connecting the first wall to the second wall,
wherein the first fuel nozzle assembly and the second fuel nozzle assembly are moveable along a radial direction to adjust the nozzle throat area based at least on a difference in pressure of a flow of fluid upstream and downstream of the convergent-divergent nozzle.

4. The system of claim 3, the system further comprising:
a first actuator assembly coupled to the first fuel nozzle assembly and a second actuator assembly coupled to the second fuel nozzle assembly, wherein the first actuator assembly is configured to extend and retract the first fuel nozzle assembly and the second actuator assembly is configured to extend and retract the second fuel nozzle assembly to adjust the nozzle throat area.

5. The system of claim 3, the system further comprising:
a controller configured to perform operations, the operations comprising modulating the nozzle throat area to change a geometry of shockwaves from an inlet section downstream to the convergent-divergent nozzle.

6. The system of claim 5, wherein modulating the nozzle throat area to change the geometry of shockwaves includes changing an angled train of oblique shockwaves to a substantially normal shockwave at the convergent-divergent nozzle.

7. The system of claim 5, the operations further comprising:
extending or retracting the first fuel nozzle assembly and the second fuel nozzle assembly into the gas flowpath to modulate the nozzle throat area.

8. The system of claim 7, wherein extending or retracting the first fuel nozzle assembly and the second fuel nozzle assembly is based at least on a Mach number of inlet air flow.

9. The system of claim 7, wherein extending or retracting the first fuel nozzle assembly and the second fuel nozzle assembly to modulate the nozzle throat area is based at least on maintaining a substantially constant dynamic pressure at the inlet section.

10. The system of claim 7, wherein extending or retracting the first fuel nozzle assembly and the second fuel nozzle assembly is based on a minimum number of cells required to sustain a desired rotating detonation downstream of the convergent-divergent nozzle.

11. The system of claim 5, the operations further comprising:
increasing the nozzle throat area to increase output thrust; and
decreasing the nozzle throat area to decrease output thrust.

12. The system of claim 5, the operations further comprising:
adjusting a stoichiometry of fuel and oxidizer via changes in flow rate of fuel at the convergent-divergent nozzle.

* * * * *